United States Patent
Corinella

(10) Patent No.: US 9,338,725 B2
(45) Date of Patent: May 10, 2016

(54) MOBILE DEVICE FOR USE IN A DYNAMIC AND STOCHASTIC ASYNCHRONOUSLY UPDATED WIRELESS AD-HOC NETWORK

(71) Applicant: Dahrwin LLC, Wilmington, DE (US)

(72) Inventor: Justin Tyler Corinella, Brooklyn, NY (US)

(73) Assignee: Dahrwin LLC, Wilmington, DE (US)

( * ) Notice: Subject to any disclaimer, the term of this patent is extended or adjusted under 35 U.S.C. 154(b) by 14 days.

(21) Appl. No.: 14/261,243

(22) Filed: Apr. 24, 2014

(65) Prior Publication Data

US 2014/0233496 A1    Aug. 21, 2014

Related U.S. Application Data

(63) Continuation of application No. 13/403,966, filed on Feb. 23, 2012, now Pat. No. 8,774,147.

(51) Int. Cl.
| | |
|---|---|
| *H04W 40/02* | (2009.01) |
| *H04W 84/18* | (2009.01) |
| *H04L 12/721* | (2013.01) |
| *H04L 12/715* | (2013.01) |

(52) U.S. Cl.
CPC .............. *H04W 40/02* (2013.01); *H04W 84/18* (2013.01); *H04L 45/44* (2013.01); *H04L 45/46* (2013.01)

(58) Field of Classification Search
CPC ........ H04L 45/44; H04L 45/46; H04W 84/18
See application file for complete search history.

(56) References Cited

U.S. PATENT DOCUMENTS

| | | |
|---|---|---|
| 6,816,460 B1 | 11/2004 | Ahmed et al. |
| 7,388,869 B2 | 6/2008 | Butehorn et al. |
| 7,403,492 B2 | 7/2008 | Zeng et al. |
| 7,463,907 B2 | 12/2008 | Smith et al. |
| 7,613,458 B2 | 11/2009 | Roberts |
| 7,619,999 B2 | 11/2009 | DaCosta |
| 7,636,343 B2 | 12/2009 | Mizukoshi |
| 7,649,884 B1 * | 1/2010 | Ahmed et al. ............. 370/390 |
| 7,697,893 B2 | 4/2010 | Kossi et al. |
| 7,720,037 B2 | 5/2010 | Bill |
| D626,072 S | 10/2010 | Tseng et al. |

(Continued)

FOREIGN PATENT DOCUMENTS

| | | |
|---|---|---|
| EP | 2366261 A1 | 12/2011 |
| WO | 2010022185 A1 | 2/2010 |

(Continued)

OTHER PUBLICATIONS

International Search Report of PCT/US2014/016206, Jun. 3, 2014.

(Continued)

*Primary Examiner* — Benjamin Lamont
(74) *Attorney, Agent, or Firm* — Amster, Rothstein & Ebenstein LLP

(57) ABSTRACT

A method for establishing and maintaining a dynamic network designed to allow wireless devices to communicate with one another on an ad-hoc basis. The wireless network is designed specifically to function autonomously, remaining completely independent from relying on any internet service provider or any other subsidiary systems such as any access points or routers. Rather than using central routers, all nodes in the network share the same capabilities as one another, and allow for a dynamic routing protocol to be executed directly by the network nodes.

28 Claims, 18 Drawing Sheets

(56) References Cited

U.S. PATENT DOCUMENTS

| | | | |
|---|---|---|---|
| 7,831,206 B2 | 11/2010 | Dupcinov et al. | |
| 7,924,747 B2 | 4/2011 | McNeill et al. | |
| 7,969,952 B2 | 6/2011 | Sin | |
| 7,974,234 B2 | 7/2011 | Gustave et al. | |
| 7,983,207 B2 | 7/2011 | Lai et al. | |
| 7,984,132 B2 | 7/2011 | Park et al. | |
| 8,031,083 B2 | 10/2011 | Sendrowicz | |
| 8,060,017 B2 | 11/2011 | Schlicht et al. | |
| 8,068,454 B2 | 11/2011 | Bonta et al. | |
| 8,135,655 B2 | 3/2012 | Oaten et al. | |
| 8,230,108 B2 | 7/2012 | Pratt, Jr. et al. | |
| 8,274,928 B2 | 9/2012 | Dykema et al. | |
| 8,279,778 B2 | 10/2012 | Shuey | |
| 8,401,016 B2 | 3/2013 | Li | |
| 8,483,196 B2 | 7/2013 | Wang et al. | |
| 8,774,147 B2 | 7/2014 | Corinella et al. | |
| 2003/0204625 A1 | 10/2003 | Cain | |
| 2005/0058108 A1 | 3/2005 | Ekberg et al. | |
| 2006/0073839 A1 | 4/2006 | Gorday et al. | |
| 2006/0098609 A1 | 5/2006 | Henderson et al. | |
| 2006/0126524 A1 | 6/2006 | Tateson | |
| 2006/0133328 A1* | 6/2006 | Levendel et al. | 370/338 |
| 2006/0218225 A1 | 9/2006 | Hee Voon et al. | |
| 2006/0234631 A1 | 10/2006 | Dieguez | |
| 2006/0268879 A1 | 11/2006 | Xhafa et al. | |
| 2007/0033257 A1 | 2/2007 | Nakajima et al. | |
| 2007/0214283 A1 | 9/2007 | Metke et al. | |
| 2008/0031203 A1 | 2/2008 | Bill | |
| 2008/0310340 A1* | 12/2008 | Isozu | 370/328 |
| 2009/0154481 A1 | 6/2009 | Han et al. | |
| 2010/0226284 A1 | 9/2010 | Bill | |
| 2011/0034176 A1 | 2/2011 | Lord et al. | |
| 2011/0122798 A1 | 5/2011 | Hughes et al. | |
| 2011/0143757 A1 | 6/2011 | Oh et al. | |
| 2011/0182205 A1 | 7/2011 | Gerdes et al. | |
| 2011/0222515 A1 | 9/2011 | Wang et al. | |
| 2012/0105214 A1* | 5/2012 | Sanders | 340/10.42 |
| 2012/0316941 A1 | 12/2012 | Moshfeghi | |
| 2013/0013809 A1 | 1/2013 | Vasseur et al. | |
| 2013/0114482 A1* | 5/2013 | Oh et al. | 370/310 |
| 2013/0170393 A1 | 7/2013 | Bill | |
| 2013/0170394 A1 | 7/2013 | Bill | |
| 2013/0194970 A1 | 8/2013 | Bill | |
| 2013/0195095 A1 | 8/2013 | Bill | |
| 2013/0208714 A1 | 8/2013 | Bill | |
| 2014/0196025 A1 | 7/2014 | Corinella | |

FOREIGN PATENT DOCUMENTS

| | | |
|---|---|---|
| WO | 2010028311 A1 | 3/2010 |
| WO | 2011112716 A1 | 9/2011 |
| WO | 2014127104 A2 | 8/2014 |

OTHER PUBLICATIONS

Written Opinion of PCT/US2014/016206, Jun. 3, 2014.
Kickstarter, Zuli Smartplugs by Zuli Inc., https://www.kickstarter.com/projects/zuli/zuli-smartplugs (last accessed Aug. 7, 2014).
Kickstarter, The Luminode: An Evolutionary Leap in Smart Home Technology by Think Automatic, https://www.kickstarter.com/projects/787856320/the-luminode-an-evolutionary-leap-in-smart-home-te?ref=discovery (last accessed Aug. 7, 2014).
Williams, Marlyn, "Facebook eyes making local connections with mesh networks," Computerworld (Aug. 16, 2013).
Hui, Jonathan W. et al., "Extending IP to Low-Power, Wireless Personal Area Networks," Internet Computing, IEEE vol. 12, Issue 4 (Jul.-Aug. 2008).

* cited by examiner

MOBILE DEVICE FOR USE IN A DYNAMIC AND STOCHASTIC ASYNCHRONOUSLY UPDATED WIRELESS AD-HOC NETWORK

CROSS-REFERENCE TO RELATED APPLICATIONS

This application is a continuation of U.S. Ser. No. 13/403,966, filed on Feb. 23, 2012, the contents of which are incorporated herein by reference.

BACKGROUND OF THE INVENTION

1. Field of Invention

The present invention relates to wireless networks and network routing protocols. Specifically, the system is for deploying a dynamic wireless ad-hoc network that can function autonomously, in which all network nodes share the same role functions based on their capabilities.

2. Prior Art

Several wireless communication technologies are currently commercially available. Radio Frequency Identification technology, or RFID, can be used only for information retrieval. Its range is also limited to approximately 3 meters. Further advances led to the development of infrared data transfer, near-field communications (NFC), and Bluetooth technology. Each of these has its own shortcomings.

Infrared technology requires a clear sight line between the transmitting device and the receiving device. In addition, infrared transmissions have a limited range of approximately 5 meters. Furthermore, infrared technology can generally only connect two devices at one time.

Near-field communications require extremely close range to operate. The effective range is approximately 10 centimeters. NFC is primarily used for identifying a credit card account to a payment terminal. Popular uses include MasterCard's PayPass and Visa's Blink programs. Some mobile devices are now also capable of NYC transmissions, allowing individuals to make payments with their mobile devices.

Bluetooth technology has a short distance maximum range. While this range might allow for establishing a wireless network between devices, Bluetooth requires that both the transmitting device and receiving device both provide a pass code to allow connection. Once that connection has been established, it can be deactivated and reactivated without the need to enter the code again. However, Bluetooth devices can only be associated with a limited number of other devices at any one time. Bluetooth technology is also characterized by a master-slave relationship between the two connected devices in which one device is controlling the functions of the other. Bluetooth also requires that each slave device be synchronized to the master device.

Wireless networking technologies that are currently available in the marketplace rely on the existence of a static infrastructure. These technologies require routers to relay data between devices, and gateways to connect the entire network to a third-party network such as the internet.

U.S. Pat. No. 8,031,083 to Sendrowicz describes modes of communication between devices in an ad-hoc network. While the disclosed network is inherently dynamic, it requires at least one static communication node to form the network.

U.S. Pat. No. 7,984,132 to Park et al. discloses a method for discovery of peer devices in a mobile ad-hoc network. The method is intended for a peer-to-peer network and is directed to a method of adapting a peer discovery process to multiple discovery rates.

U.S. Pat. No. 7,974,234 to Gustave et al. relates a method of authenticating a mobile network node. The method described requires the presence of authentication servers or other infrastructure to assist in authentication of each device.

U.S. Pat. No. 7,969,952 to Sin teaches a method of implementing a routing system that delivers data to multiple devices simultaneously in a mobile at-hoc network. The disclosed method requires each node to first transmit control packets and, based on the packets that are returned to the source node through the routing system, calculate which neighboring nodes have that most nodes adjacent to them in order to choose the best node to transmit information to.

U.S. Pat. No. 7,636,343 to Mizukoshi describes an ad-hoc system and terminal synchronization method. This method enables the joining of two networks and requires separate synchronization servers.

There do exist in the marketplace some technologies that are capable of creating, deploying and maintaining an infrastructure-less wireless ad-hoc network. However, these technologies require the use of scheduled topology updates and/or control signals that are constantly transmitted between devices.

U.S. Pat. No. 7,697,893 to Kossi et al. discloses a method of implementing an ad-hoc network between wireless devices by using two signals. One signal is used for control and the other is used for data communication.

U.S. Pat. No. 7,613,458 to Roberts teaches a wireless network node that can selectably function as a router. The method provides for controlling network nodes such that under certain conditions each may be made to function as a router.

EP 2 366 261 A1 to Copeland recites a method of communicating between devices in a mobile ad-hoc network using a waveform that contains both the data to be communicated and data that identifies the node from which the communication was sent.

U.S. Patent Application Publication No. 2011/0222515 A1 to Wang et al. discloses a method of synchronizing two wireless ad-hoc networks by changing one network's internal timing so that both network operate with the same notion of time.

SUMMARY OF THE INVENTION

The present invention is based, in part, on the realization that what does not exist in the marketplace is a method of creating and maintaining a dynamic wireless ad-hoc network in an asynchronous fashion, in which all devices share the same role functionalities based on their capabilities and wherein devices can enter or leave the network at any time without causing any service disruption to the rest of the network.

It is an object of the present invention to provide a method of creating and updating the topology of an asynchronous wireless ad-hoc network in a stochastic and highly dynamic environment.

It is another object of the present invention to provide a method of establishing and maintaining a wireless ad-hoc network which is independent of any third party network.

Is it yet another object of the present invention to provide a method of connecting multiple wireless ad-hoc networks into a single wireless ad-hoc network through a network node connected to two or more wireless ad-hoc networks.

It is yet a further object of the present invention to provide a method of establishing a wireless ad-hoc network without the need for a pre-existing network infrastructure.

It is still another object of the present invention to provide a method of establishing a wireless network in which each device shares the same role functionalities based on their capabilities.

It is yet another object of the present invention to provide a method of joining a device to and removing a device from a wireless ad-hoc network without causing any network service interruption to other devices within the network.

In accordance with these and other objects, the present invention provides a method of creating and maintaining an asynchronous dynamic wireless ad-hoc network.

In one embodiment, wireless devices in range of one another form a network between them. Any device that comes within range of these devices becomes part of the same network. Each device can transmit data to its immediately neighboring devices. This forms a dynamic wireless ad-hoc network, or DYNAMET. Data can be transmitted between devices that are not direct neighbors through implementation of the Redundant Dynamic Protocol (RDP). This protocol uses information about the connection quality of each of the neighboring devices and sends redundant packets to each device that meets a certain threshold signal quality. The RDP tags each transmission with a code that identifies the intended destination device and a code that identifies the source device. When devices receive the data, the RDP compares the destination code with the recipient device's identification code. If the codes match, the device processes the data. If the recipient device is not the destination device, the RDP adds the receiving device's identification code and retransmits the data to the neighboring devices that meet the propagation threshold. This process continues in a cascade fashion until the data reaches its intended destination.

In another embodiment, at least one device in each of two or more separately formed DYNAMET clusters can come within range of each other. Once a connection between such devices is established, all the clusters become a single DYNAMET unit called a Locally Available DYNAMET (LAD). The LAD network architecture is identical to that of a simple DYNAMET cluster. The separate clusters that formed the LAD cease to be distinct units and merge together seamlessly and without causing any network service interruptions. Individual devices or whole clusters can move out of range of the LAD without causing service interruptions to either the LAD or the separated cluster.

In a further embodiment DYNAMET clusters and LADs that in different geographical locations can be concatenated into a single network through an assisted connection to a Third Party Network (TPN) or Assistant Relay Node (ARN). The devices in each DYNAMET or LAD that contact the TPN or ARN are capable of using the TPN or ARN to relay information between each DYNAMET or LAD, creating a Globally Available DYNAMET (GAD). The GAD also becomes a cloud-based resource to which other RDP-enabled devices can connect.

Thus, a method of deploying a dynamic wireless adhoc network and transmitting data across such a network is described.

BRIEF DESCRIPTION OF THE DRAWINGS

Embodiment of the invention will be understood and appreciated more fully from the following detailed description in conjunction with the figures, which are not to scale, in which like reference numerals indicate corresponding, analogous or similar elements, and in which.

DETAILED DESCRIPTION OF THE PRESENT INVENTION

The following preferred embodiments as exemplified by the drawings are illustrative of the invention and are not intended to limit the invention as encompassed by the claims of this application.

The invention as described herein is a dynamic and stochastic, asynchronously updated wireless ad-hoc network.

Figure 1:
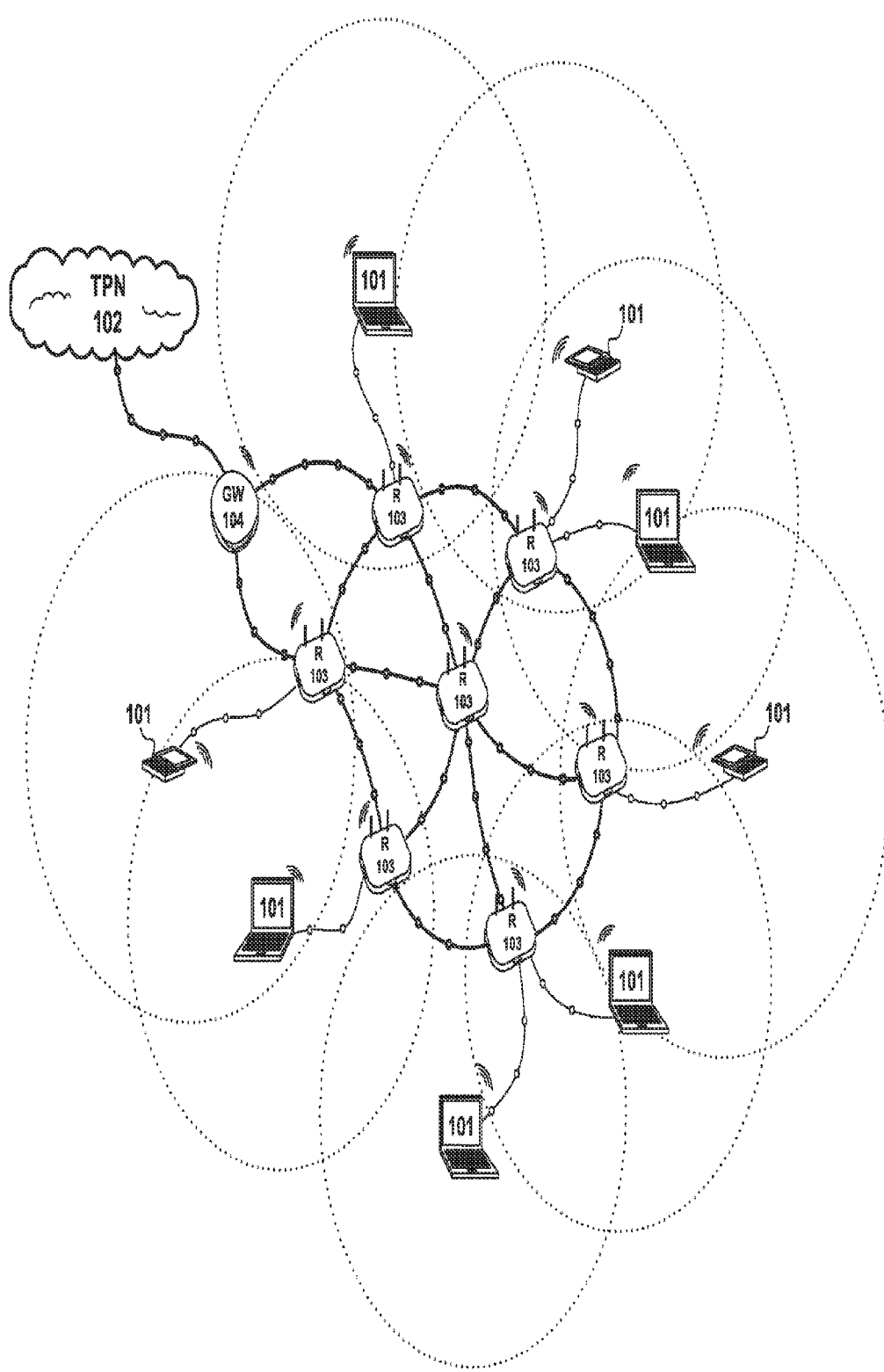
FIG. 1 shows a diagram of the prior art wireless network architecture.

In the prior art, networks are established with designated roles specific to each device. Referring to FIG. 1, special gateway routers 104 are used to allow network access to an outside Third Party Network (TPN) 102. Routers 103 act as nodes and function as switches for network relaying, and end-user devices 101 play an independent role, communicating through the established network. End-user devices do not provide any capability for additional device connection. Such capabilities are held only by the routers 103. Data can be transmitted from one end-user device to another only by delivering such data to a router 103, which then relays the data to the destination device if said device is connected to the router 103. Otherwise, the router 103 relays the data to the router to which the destination end-user device 101 is connected and that router 103 sends the data to its destination. In this network, data may be relayed through several routers before reaching their destination. If data is to be transmitted to any node outside of the network, the data must be relayed from a device 101 through routers 103 to gateway 104 which is ultimately capable of relaying data to and from a TPN 102 such as the Internet.

Figure 2:
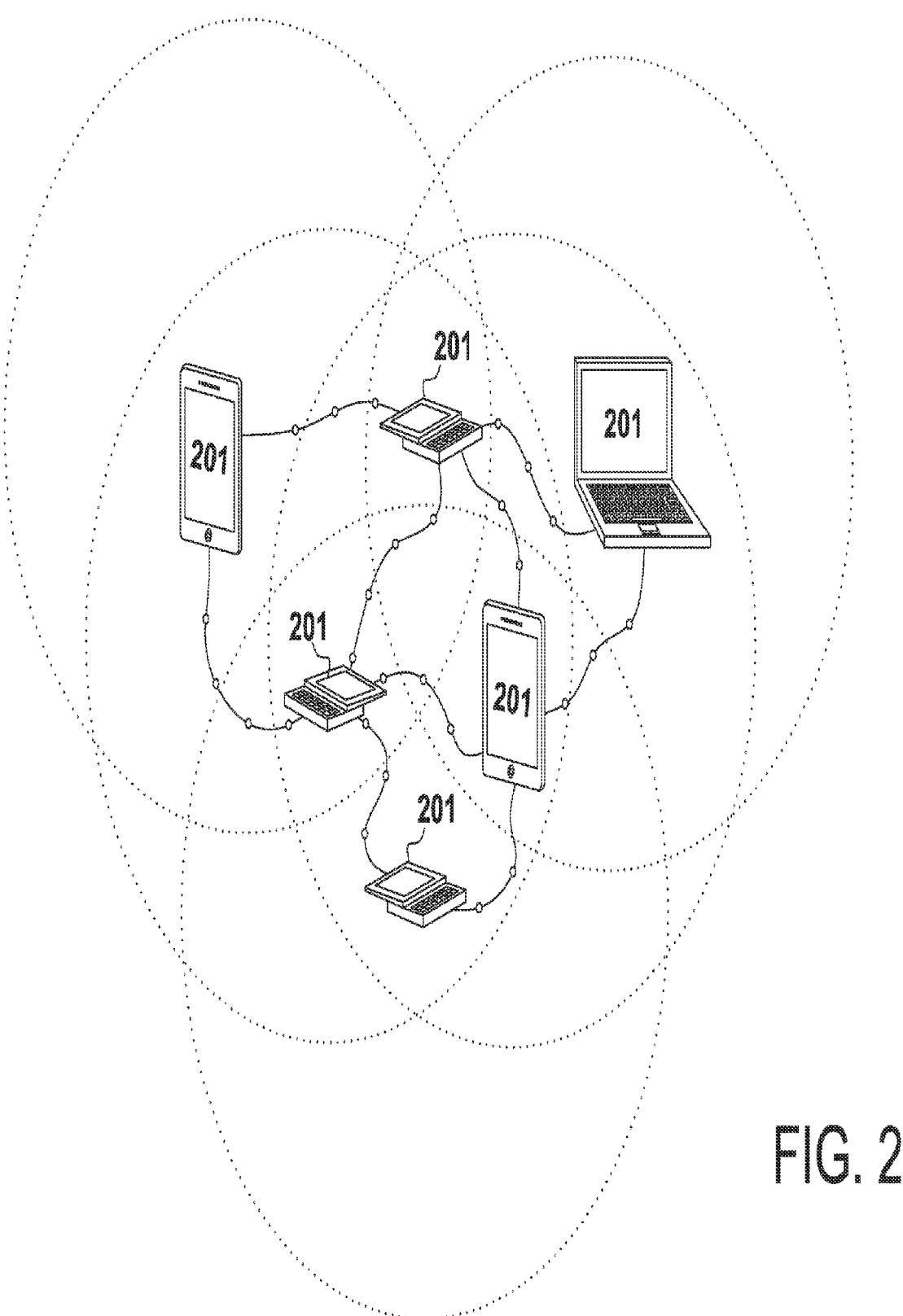
FIG. 2 shows a diagram of an embodiment of the present invention.

Referring to FIG. 2, in the Dynamic Ad-Hoc Network (DYNAMET), end-user devices 201 are capable of establishing direct connections to each other, as well as gateway connections to outside TPNs. Each end-user device 201 is also capable of relaying data from other devices. Rather than using routers or any centralized infrastructure, all devices in the DYNAMET share the same role functionality, allowing them to act as relays, gateways and end-users based on each device's capability.

Figure 3:
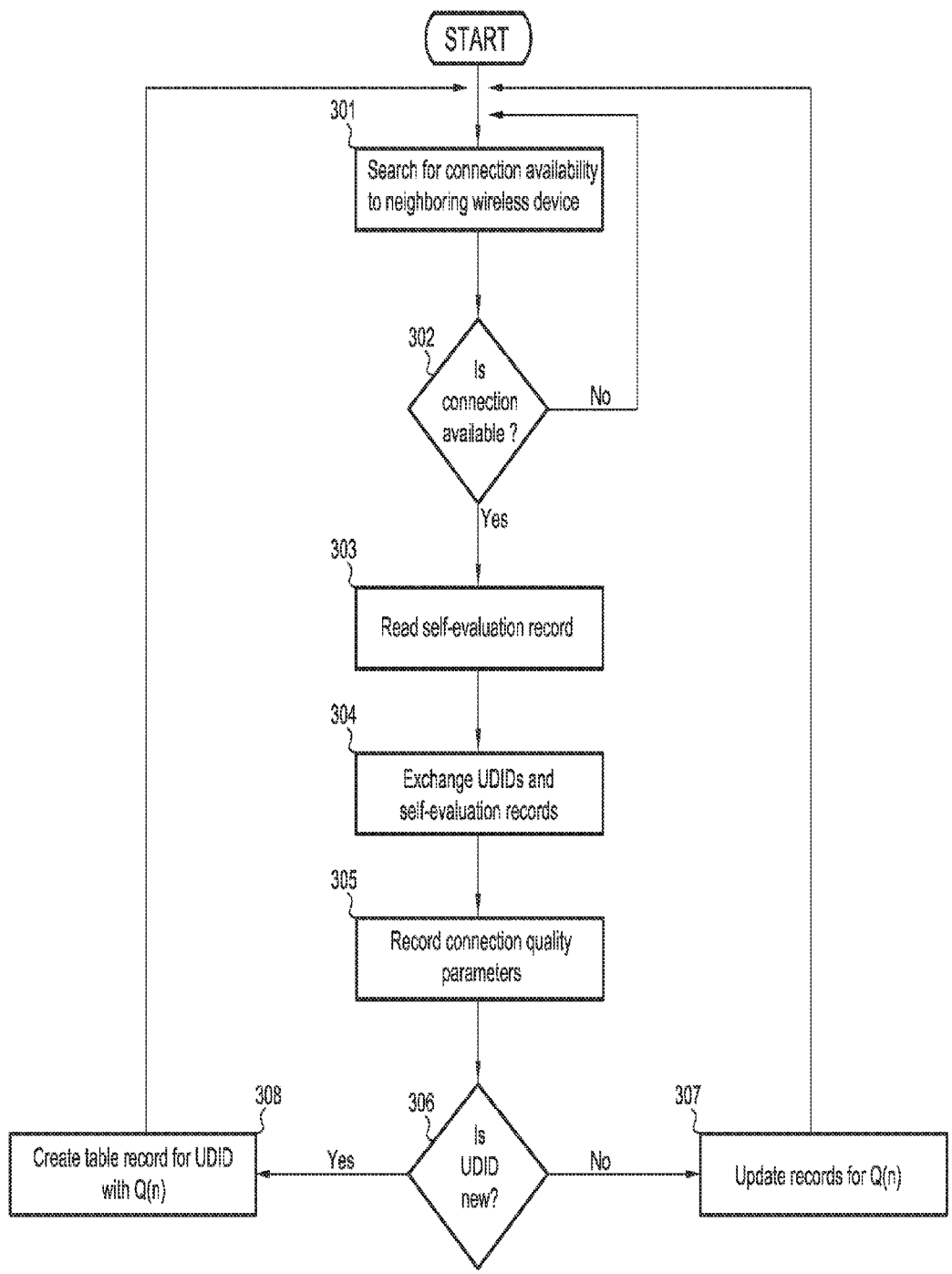
FIG. 3 is a flowchart of the network connection process according to an embodiment of the present invention.

Referring now to FIG. 3, every device in the DYNAMET searches for other available devices 301. Every device has a unique identification code. This code, hereinafter referred to as a Unique Device Identifier (UDID) is used both for identification of a device as well as to target data to a specific destination device. Each device in the DYNAMET contains a neighbors quality table in which it maintains a listing of known neighboring devices and their respective connection quality, in addition to neighboring devices' functional capabilities, along with their various time functions, which will be discussed below. In the DYNAMET when a device detects a UDID within its range 302, it checks its self-recorded evaluation records to retrieve its own evaluated parameters 303. The discovering device and the newly found device then exchange UDIDs along with their self-recorded tables containing their evaluated parameters 304. Connection quality between the two devices is then recorded, which is an evaluation available connection parameters such as the signal strength, connection data rate, retransmission rate, packet loss ratio, and any other available parameters to be evaluated 305. The device is then checked against the list of recorded neighbors to see if its UDID is already listed in the table 306. If the UDID is already listed, the device updates its neighbors quality table 307. If the UDID is not listed, a table record is created for the UDID with its evaluated neighbor quality 308. The discovery process then repeats itself.

Figure 4:
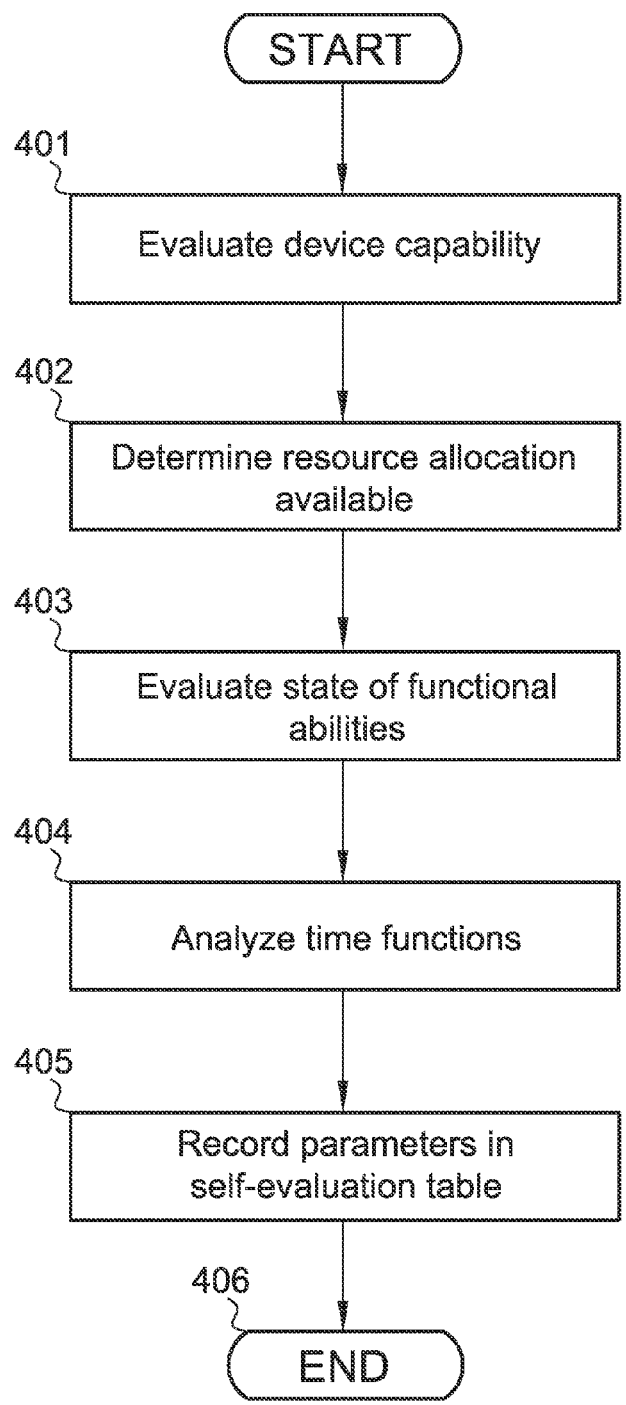
FIG. 4 is a flowchart of the connections maintenance process according to an embodiment of the present invention.

The DYNAMET has an inherently dynamic network topology. Nodes constantly move toward or away from each other. Each node device must keep its self-evaluation table record updated in order to maintain an up-to-date neighbors quality table, both for itself and for its neighbors. Referring to FIG. 4, a node first evaluates its device capability 401. The node gathers all information relevant to its performance in the DYNAMET. Available resources are then identified by the device 402 in order to calculate a self-evaluated neighbor quality ($Q(n)$), which is calculated based on many variables including connection quality and functional abilities, along with various functions of time. As stated above, connection quality is measured based on signal strength, connection data rate, retransmission rate, packet loss ratio, and other factors for each neighboring device. These data are found in the neighbors quality table for each UDID for which the device has a record. Functional abilities include the function role of a device (i.e. a relay node, assistant relay node or border node), number of neighbors available, battery life, wireless media available, hardware components and device capabilities, third-party resources such as GPS, speedometers or accelerometers to determine position, speed or acceleration. The state of these functional abilities is then evaluated 403. The node detects what functions are in use, such as the current battery life, what wireless media are currently in use. Additionally, various time functions such as the total time a device is connected to the DYNAMET, the time spent connected to a specific neighbor, and the time spent performing role functionalities are analyzed 404. All variables are evaluated together to determine $Q(n)$ for the device. The $Q(n)$ and associated parameter data is then recorded in the device's self-evaluation table 405. This record is then available to be shared with any device executing the discovery process described above.

Figure 5:
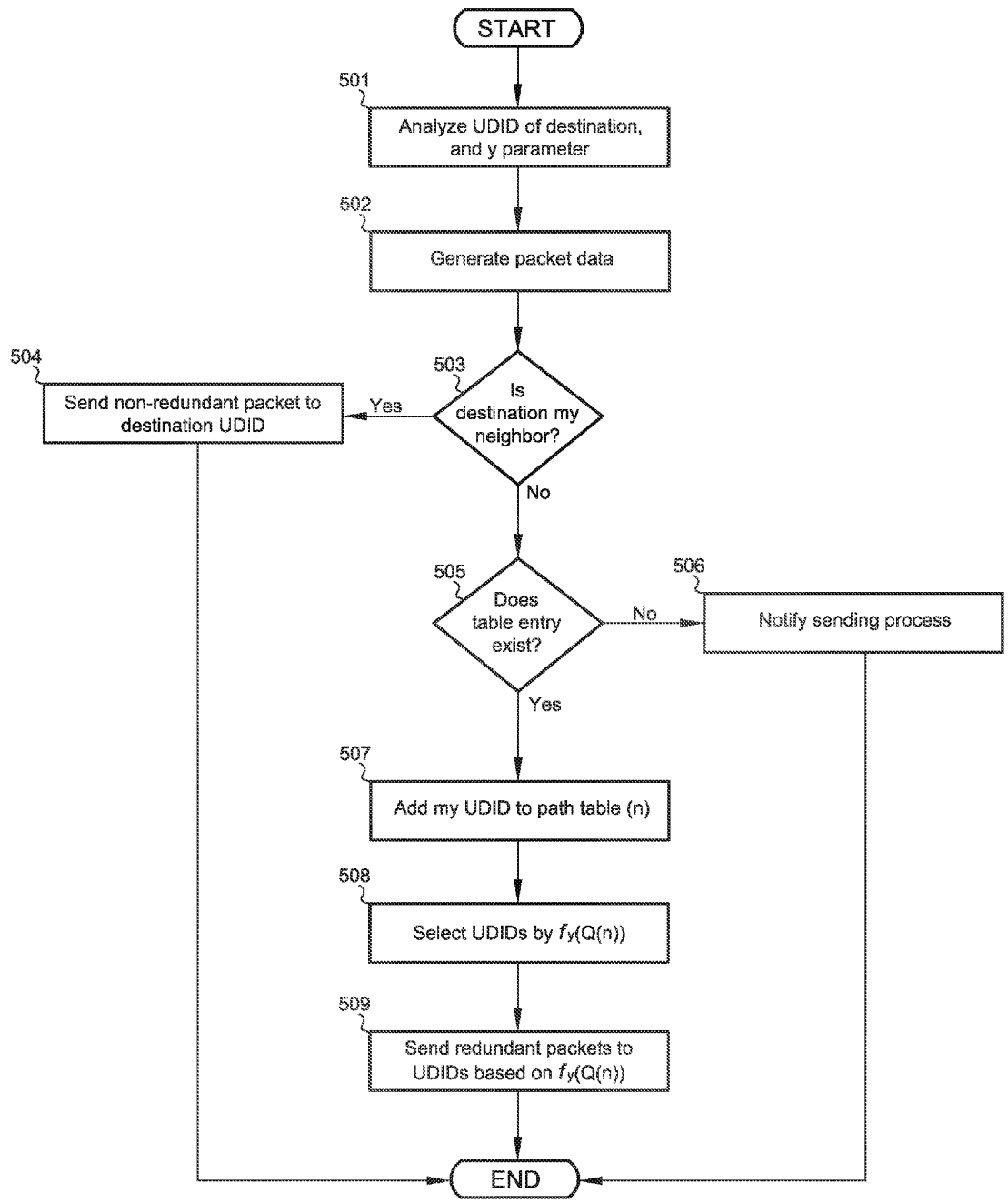
FIG. 5 is a flowchart of the packet generation process according to an embodiment of the present invention.

Referring now to FIG. 5, when data is to be transmitted from one device to another the transmitting device, or source device, first analyzes the UDID of the destination device and the threshold parameter y 501 and generates a data packet 502 that is targeted to the destination UDID. This is achieved through use of a packet header which contains the destination UDID as well as the source UDID. This allows any receiving device to determine where the packet originated and where it must be sent. The source device then compares the destination UDID to the entries in its connections table in order to determine if the destination UDID is a neighboring device 503. If the destination UDID is listed, the source device sends the packet directly to the destination device 504. If the UDID is not listed, the source device checks to make sure that there are any connections currently available in its connections table 505. If not, the sending process is notified that no connections are available 506 and transmission of the packet is aborted. If connections are available, the source device adds a signature representing its own UDID to the path table in the packet 507 and then transmits redundant copies of the packet to its highest priority connections, i.e. neighboring UDIDs listed in the connections table whose $Q(n)$ value is in coherence with a determined threshold value y 508 which is calculated and determined by the particular application being run on the DYNAMET 509.

Figure 6:
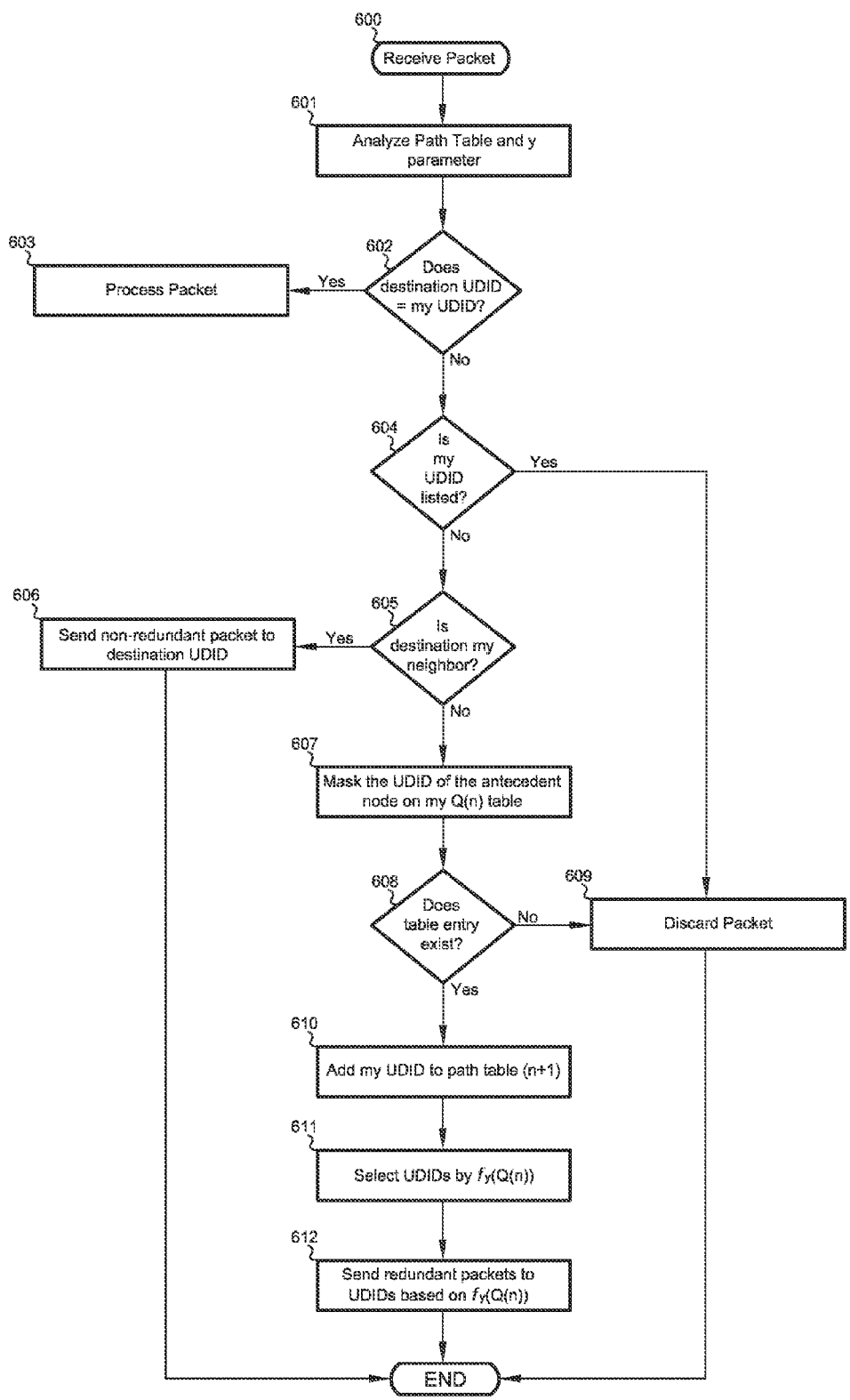
FIG. 6 is a flowchart of the packet propagation process according to an embodiment of the present invention.

Referring to FIG. 6, when a device receives a packet 600, it must decide what action to take. The receiving device first analyzes the path table in the packet and the threshold value y 601, which is set by the particular application being run, and can differ based on the particular application's requirements. The receiving device also analyzes the destination UDID 602. If the destination UDID matches the UDID of the receiving device, the receiving device processes the packet 603. If the destination UDID does not match that of the receiving device, the receiving device parses the packet signatures 604. 11 the receiving device's signature is present, indicating that the receiving device is either the source device or has already received and relayed the packet prior to its receipt of the instant duplicate, the receiving device discards the packet 609. If the receiving device's signature is not present in the packet, the device compares the destination UDID to the entries in its connections table in order to determine if the destination UDID is a neighboring device 605. If the destination UDID is listed in the connections table, the receiving device transmits the packet directly to the destination device 606. If the destination UDID is not listed in the connections table, the receiving device will attempt to relay the packet to its highest priority neighbors. In order to prevent a duplicate from being transmitted back to the device from which the packet was received, that device's UDID, represented by the first signature in the packet path table, is masked from the connections table 607. The receiving device then checks for any other entries in the connections table 608. If there are connections available, the receiving device appends its signature to the packet 610 and sends redundant packets to its designated top priority neighbors 611 in coherence with the determined threshold value y.

Figure 7:
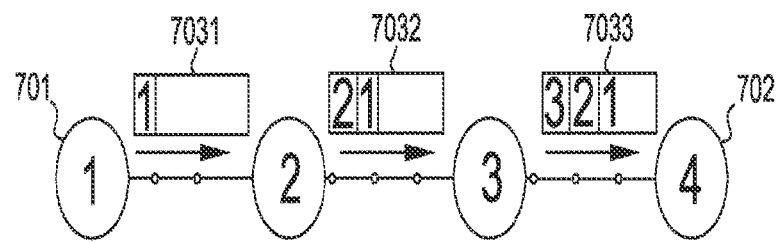
FIG. 7 shows signatures added to a path table is a packet transmitted according to an embodiment of the present invention.

In order to prevent packets transmitted over a large number of nodes from becoming too large, the space reserved in each packet for the path table is of a fixed size and is capable only of storing a certain number n signatures. Each signature can have a position value no greater than n. Referring to FIG. 7, when a device 701 transmits a packet to a destination device 702, it inserts its signature as the first entry of the path table 7031. As the packet is retransmitted by each intervening node, those devices append their signatures in front of the previous signature 7032, 7033. As each new signature is added, each preexisting signature is pushed down the table, forcing the oldest signature to approach position n. If the limit n is reached before the packet reaches the destination device, the signature at position n is removed, creating space for each subsequent signature which follow the same systematic process of pushing all signatures toward n. These signatures prevent packet propagation from occurring infinitely between devices that are not the destination device. Any device which recognizes its own signature in the packet will discard the packet as a duplicate.

Figure 8:
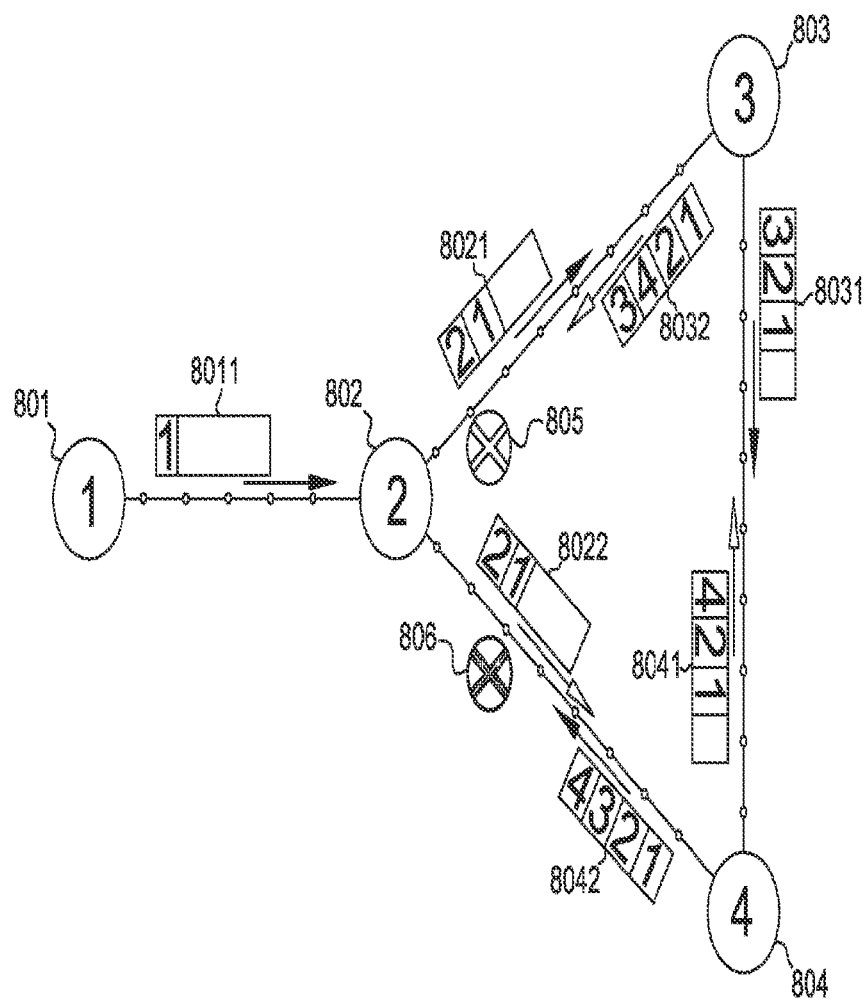
FIG. 8 shows the discarding of duplicate packets according to an embodiment of the present invention.

For example, referring to FIG. 8, Node 1 801 transmits a packet to Node 2 802. The path table in the packet contains only the signature of Node 1 8011. Node 2 802 receives the packet and retransmits to Node 3 803 and Node 4 804, adding its signature to the front of the path table in each redundant packet 8021, 8022. Node 3 803 receives the packet and transmits it to Node 4 804, adding its signature in front of Node 2's 802 signature 8031. Node 4 804 also receives the packet and transmits it to Node 3 803, adding its signature in front of Node 2's 802 signature 8041. When Node 3 803 receives the packet sent from Node 4 804, it does not recognize that it is a duplicate packet because Node 3's 803 signature is not included in the path table 8041. Node 3 803 therefore adds its signature in front of Node 4's 804 signature 8032 and transmits the packet to Node 2 802, which recognizes its own signature in the packet and discards it as a duplicate 805. When Node 4 804 receives the packet from Node 3 803, it also does not recognize that the packet is a duplicate because its own signature is not included. Node 4 804 therefore adds its signature in front of Node 3's 803 signature 8042 and transmits the packet to Node 2 802, which recognizes that the packet is a duplicate and discards it 806.

Figure 9:
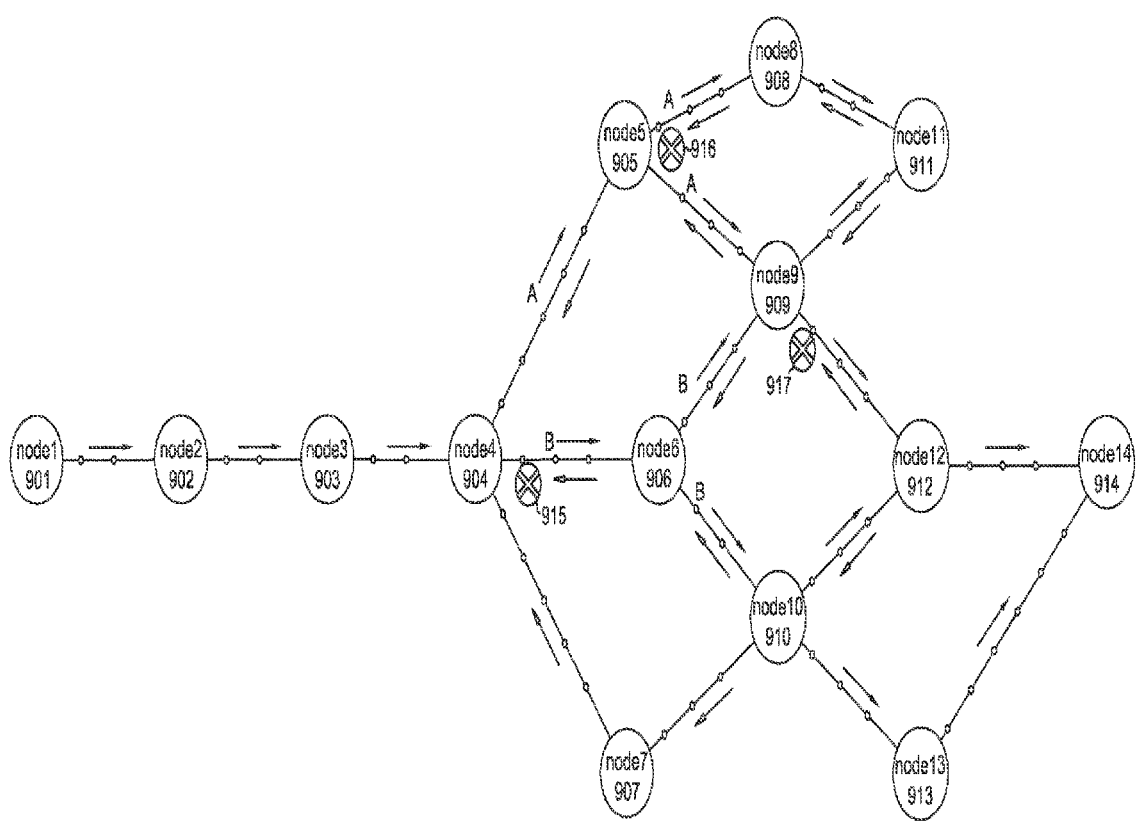
FIG. 9 shows a packet propagated across an entire DYNAMET cluster according to an embodiment of the present invention.
Figure 10A:
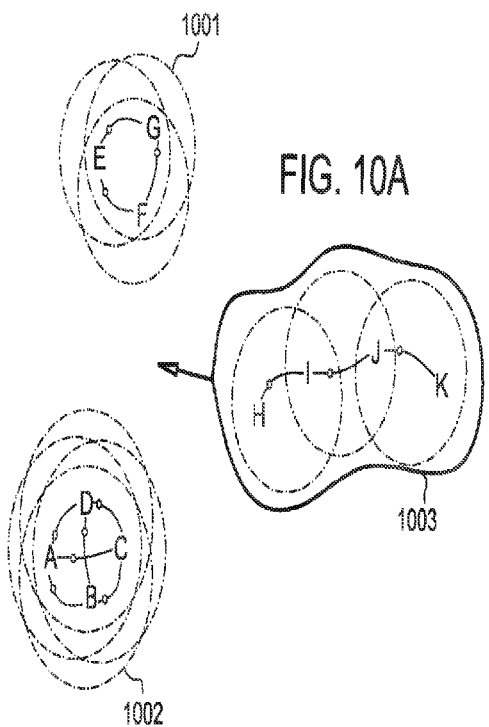
FIGS. 10A, 10B, 10C and 10D, hereinafter collectively referred to as FIG. 10, show the formation of a Locally Available DYNAMET according to an embodiment of the present invention.
Figure 10B:
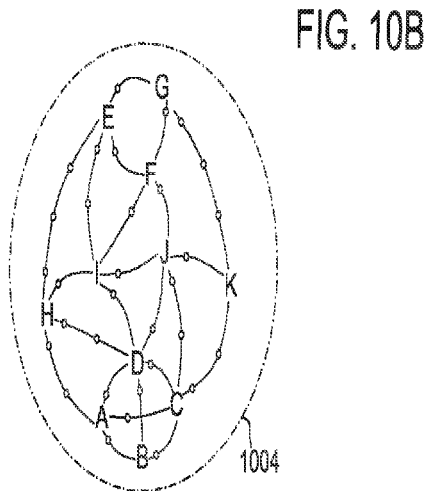
Figure 10C:
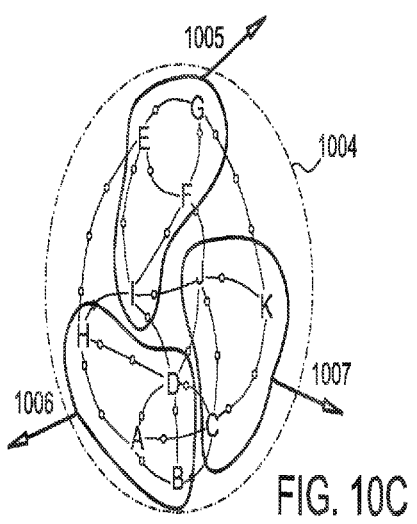
Figure 10D:
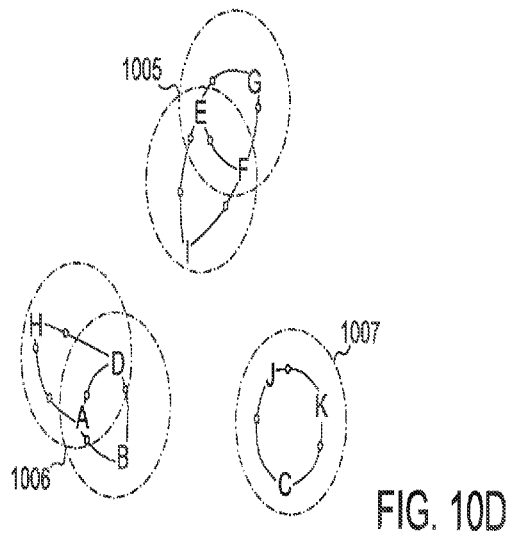

Referring now to FIG. 9 as an example of packet propagation using the RDP, Node 1 901 is the source device. Node 1 901 generates a packet whose destination is Node 14 914. Node 1 901 has only one neighboring device, Node 2 902. Node 1 901 has no option but to transmit a redundant packet to Node 2 902. When Node 2 902 receives the packet, the RDP identifies the source and destination devices from the UDIDs in the packet header and the device from which the packet was received (the sender) using the first signature in the packet path table, which at this time matches the source UDID in the packet header. The RDP masks the sender's UDID from Node 2's 902 connections table, leaving only Node 3 903 as a valid option for transmission of the packet. This process is repeated at Node 3 903, transmitting a redundant packet to Node 4 904. In this example, Node 4 904 has a Q(n) threshold value y such that redundant packets will only be sent to Node 5 905 and Node 6 906. Node 4 904 will therefore send redundant packets only to its top two priority neighbors. In this example, redundant packet A 9041A is sent to Node 5 905 and redundant packet B 9041B is sent to Node 6 906. Redundant packet A 9041A can be relayed from Node 5 905 to Node 8 908, from Node 8 908 to Node 11 911 and from Node 11 911 to Node 9 909. At Node 9 909, the RDP can relay a redundant packet to Node 5 905 where it will be recognized as a duplicate 916 due to Node 5's 905 signature in the path table. A redundant packet can also be relayed to Node 12 912. At Node 12 912 the RDP recognizes that the destination device, Node 14 914, is a direct neighbor of Node 12 912 and relay a non-redundant packet to Node 14 914. Node 9 909 can also relay a redundant packet to Node 6 906. At Node 6 906, the RDP can relay a redundant packet to Node 4 904 where it will be discarded as a duplicate 915 due to Node 4's 904 signature in the path table. A redundant packet can also be relayed to Node 10 910. At Node 10 910, the RDP can relay redundant packets to Node 12 912, Node 13 913 and Node 7 907. At both Node 12 912 and Node 13 913, the RDP will recognize that Node 114 914 is a direct neighbor and send a non-redundant packet to Node 14 914. Node 7 907 will send a redundant packet to Node 4 904 where it will be discarded as a duplicate 915.

Returning to redundant packet A 9041A received at Node 5 905, a redundant packet can also be sent to Node 9 909. A redundant packet can be relayed from Node 9 909 to Node 11 911, from Node 11 911 to Node 8 908 and from Node 8 908 back to Node 5 905 where it will be discarded as a duplicate 916. Node 9 909 can also relay a redundant packet to Node 6 906 which will in turn relay a redundant packet to Node 4 904, where it will be discarded 915, and to Node 10 910. At Node 10 910 the RDP will relay redundant packets to Node 12 912, Node 13 913 and Node 7 907. Nodes 12 and 13 912 913 will relay a non-redundant packet directly to Node 114 914. Node 7 907 will relay a redundant packet to Node 4 904 where it will be discarded 915. Node 9 909 can further relay a redundant packet to Node 12 912 where it will be sent directly to Node 14 914.

Returning to redundant packet B 9041B received at Node 6 906, the RDP can relay a redundant packet to Node 9 909, which can relay a redundant packet to Node 12 912 which will be sent directly to Node 14 914, Node 9 909 can also send a redundant packet to Node 11 911 which will relay a redundant packet to Node 8 908 and from Node 8 908 to Node 5 905. At Node 5 905, a redundant packet can be relayed to both Node 4 904 and back to Node 9 909. Both nodes will discard the packet as a duplicate 915, 917. Node 9 909 can also relay a redundant packet to Node 5 905, which will relay the redundant packet to Node 4 904 where it will be discarded 915, and to Node 8 908 where it will be relayed to Node 11 911 and from Node 11 911 back to Node 9 909 where it will be discarded 917. Node 6 606 can also relay a redundant packet to Node 10 910, which can relay redundant packets to Node 12 912, Node 13 913 and Node 7 907. From Nodes 12 and 13 912, 913 the packet will be sent directly to Node 14 914. From Node 7 907, a redundant packet will be sent back to Node 4 904 where it will be discarded 915.

In one embodiment of the invention one or more DYNAMET nodes may be equipped with a GPS location device. In such an embodiment, the GPS-enabled nodes may use the physical location of the destination node to determine to which neighboring nodes redundant packets will be sent. This is achieved by using a propagation forming algorithm rather than the IRP. A node executing the propagation forming algorithm determines in which direction the destination node lies, and only sends redundant packets to nodes that fall within that directional corridor. This results in a more efficient packet propagation that the standard IRP propagation.

Referring now to FIG. 10, when independently created DYNAMET clusters 1001, 1002, 1003 come within range of each other, the RDP allows communication between all nodes in all clusters. This results in a single larger DYNAMET cluster called a Locally Available DYNAMET (LAD) 1004.

This expansion occurs with no network interruptions. Since the DYNAMET is an inherently asynchronous network, there are no issue of synchronization between the different clusters that form the LAD 1004. When clusters 1005, 1006, 1007 within the LAD 1004 move out of each other's range, they become independent clusters once again. These clusters need not be identical to those which form the LAD 1004.

Figure 11:
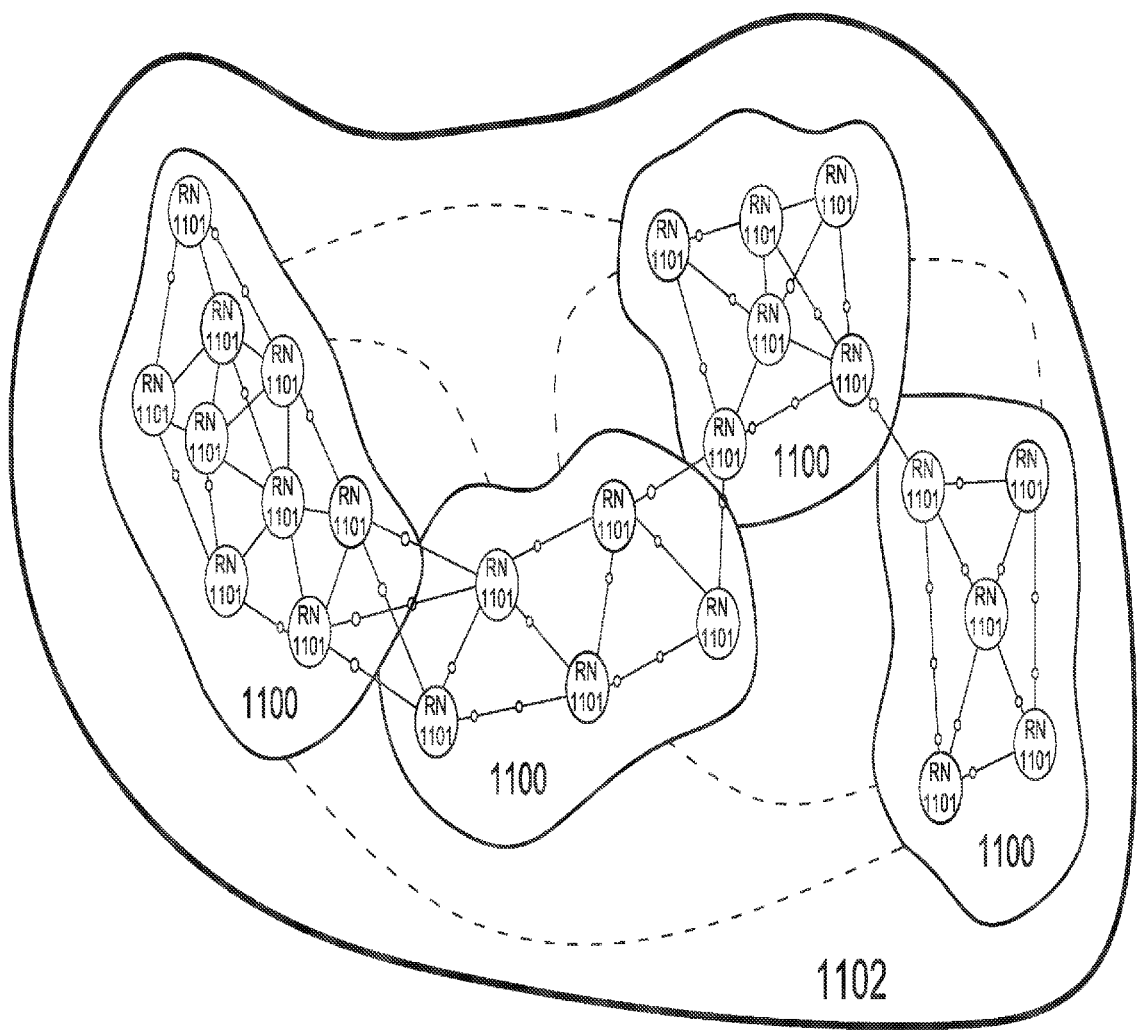
FIG. 11 shows a Locally Available DYNAMET according to an embodiment of the present invention.

In one embodiment, as shown in FIG. 11, multiple DYNAMET clusters 1100 can function as a single LAD 1102 even when clusters 1100 have only one node that is in communications range of a node in another cluster 1100.

Figure 12:
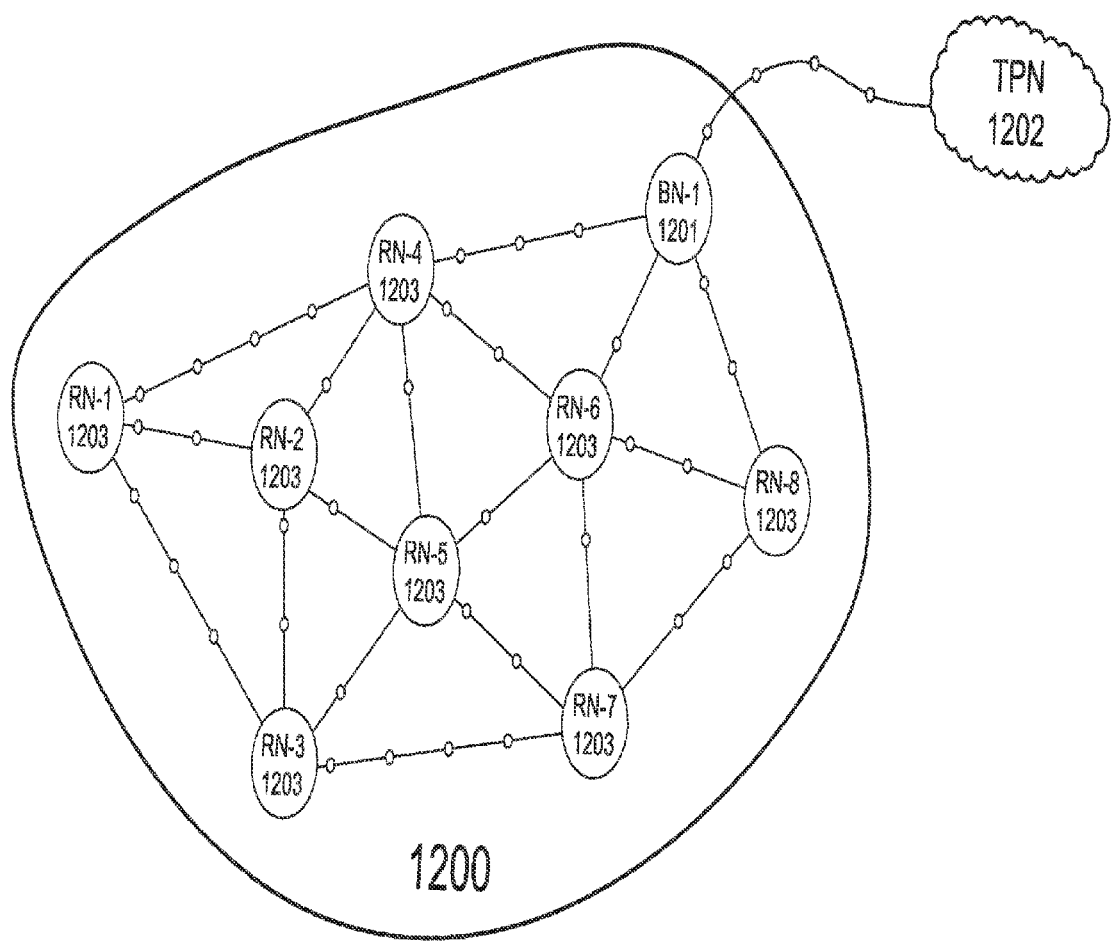
FIG. 12 shows a DYNAMET cluster connected to a Third Party Network according to an embodiment of the present invention

Within the DYNAMET, every node can communicate with every other node. In addition, each node can also act as a Relay Node (RN) and a Border Node (BN). All nodes are RNs, which perform the routing in the DYNAMET by carrying out the RDP. BNs can link DYNAMET clusters with a third party network (TPN). In one embodiment, as shown in FIG. 12, the DYNAMET cluster 1200 can access a TPN 1202 via a BN 1201. Each RN 1203 can direct packets to the TPN 1202 by targeting the BN 1201. The BN 1201 forwards the packets to the TPN 1202. Response packets from the TPN 1202 are received by the BN 1201 and redundant packets are relayed using the RDP.

Figure 13:
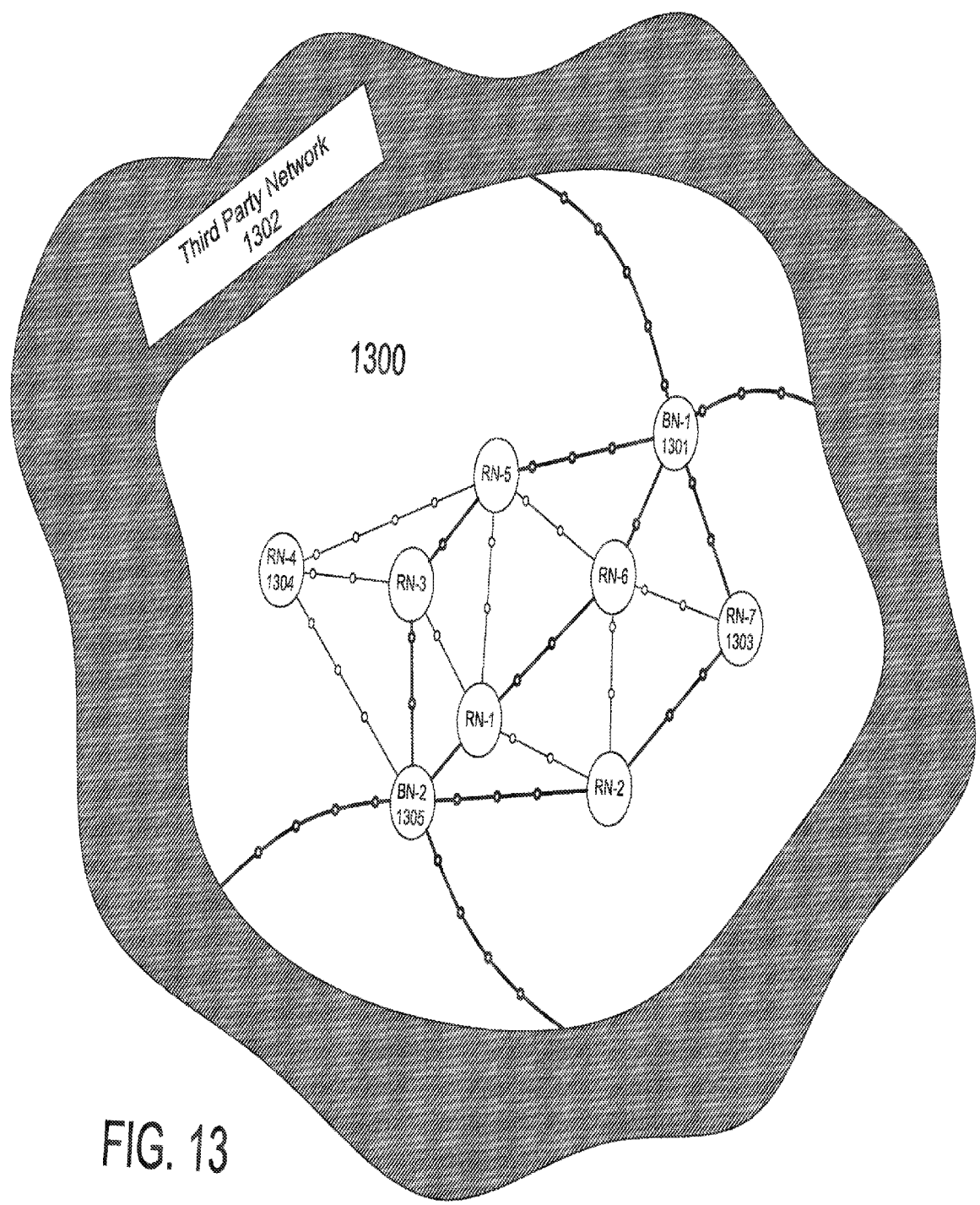
FIG. 13 shows the use of a Third Party Network as a packet relay according to an embodiment of the present invention.

Referring to FIG. 13, within a single DYNAMET cluster 1300, more than one node can act as a BN 1301, 1305. The BNs 1301, 1305 can implement the RDP over the TPN 1302, effectively utilizing the TPN 1302 as an additional node. For example, a packet sent from RN-7 1303 to RN-4 1304 would be transmitted from RN-7 1303 to RN-2, RN-6 and BN-1 1301. From BN-1 1301, the packet is transmitted directly to BN-2 1305 via their mutual connection to a TPN 1302. BN-2 1305 then transmits a non-redundant copy of the packet to its direct neighbor, RN-4 1304. This can also be achieved if BN-1 1301 and BN-5 1305 are connected to different TPNs. So long as the TPNs can communicate with each other, packets can be transmitted between the two BNs 1301, 1305.

Figure 14:
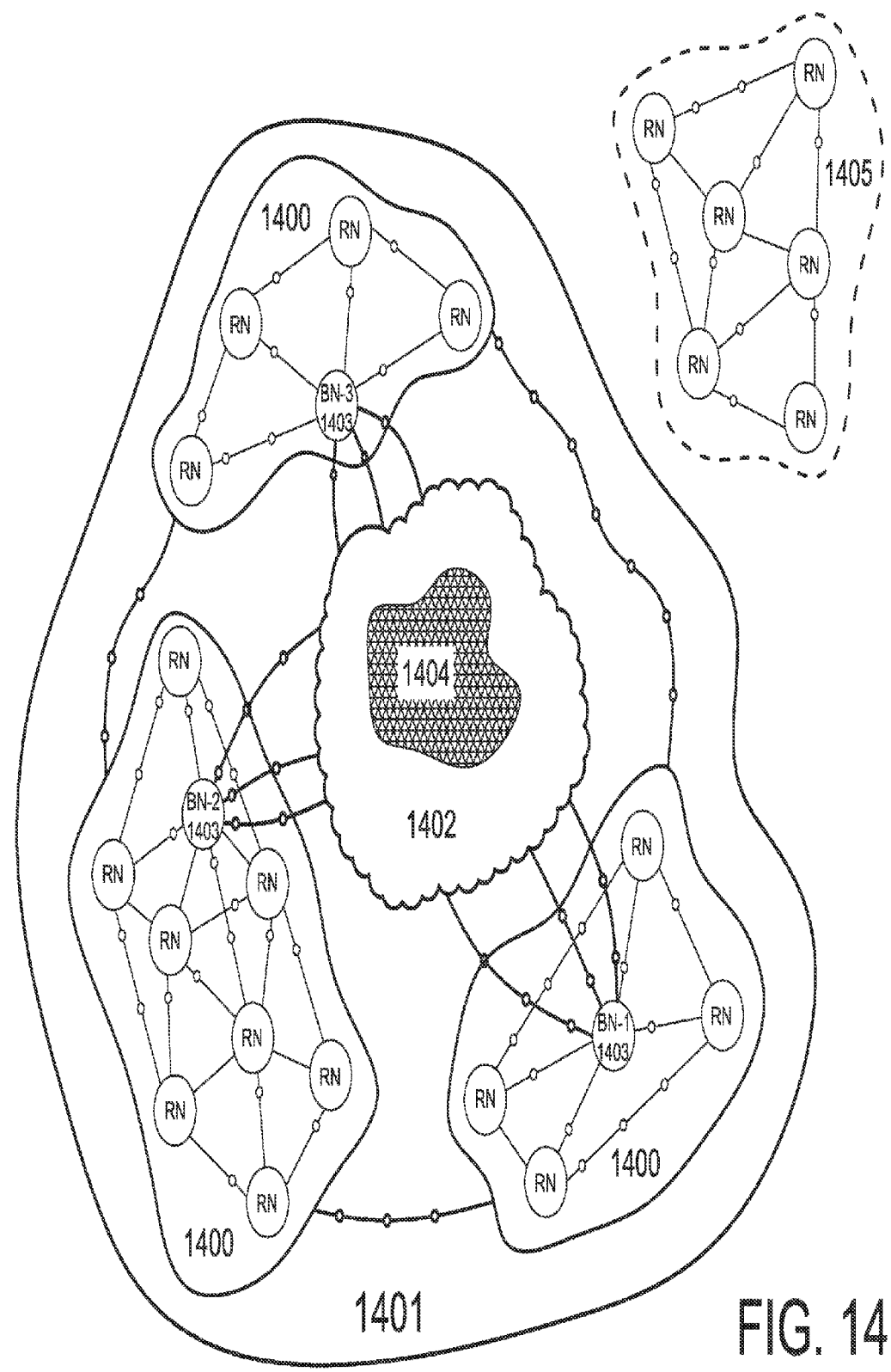
FIG. 14 shows a Globally Available DYNAMET according to an embodiment of the present invention.

Referring to FIG. 14, several separated DYNAMET clusters 1400 can function as a single DYNAMET through each cluster's connection to a TPN 1402. The resulting functional DYNAMET is referred to as a Globally Available DYNAMET (GAD) 1401. Each BN 1403 can transmit packets to any other BN 1403 in all other clusters 1400. In this way, each separate cluster 1400 can communicate with each other just as though an LAD has been formed between them. Their interconnectivity is held as a GAD 1401 on the cloud 1404 as a resource available to any additional clusters 1405 that connect to the TPN 1402. As with LADs, if any cluster leaves the TPN 1402, the remainder of the GAD 1401 suffers no service interruption.

Figure 15:
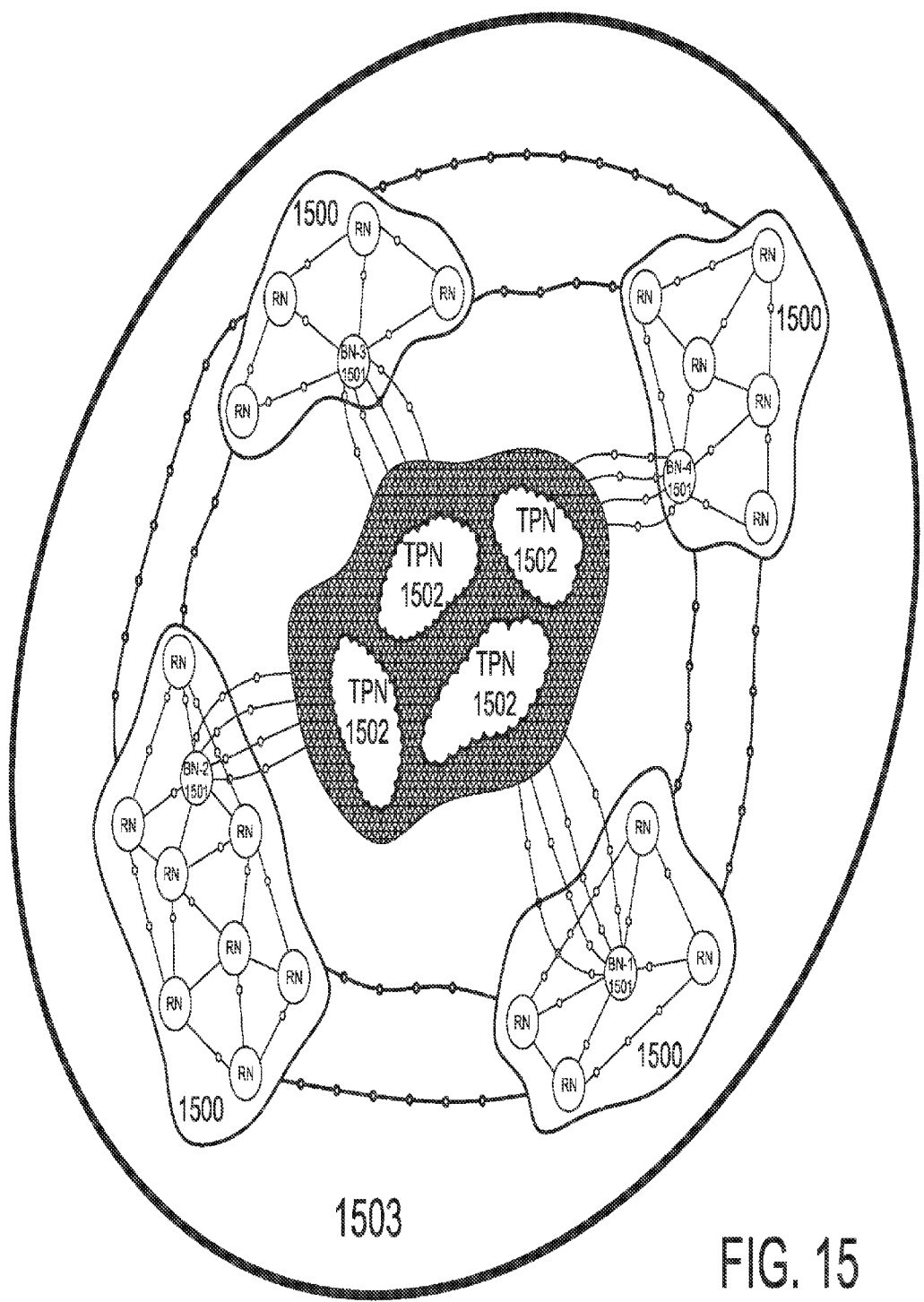
FIG. 15 shows a Globally Available DYNAMET according to an embodiment of the present invention.

Referring to FIG. 15, the GAD 1503 can also be created across multiple TPNs 1502. Each cluster 1500 can connect to a TPN 1502 via BNs 1501. So long as each TPN 1502 can communicate with each other TPN 1502, a GAD 1503 can be created.

In one embodiment of the invention, the time required to propagate a packet from source to destination can be minimized through the use of an Assistant Relay Node (ARN). An ARN is functionally equivalent to any ordinary Relay Node. However, an ARN possesses the ability to establish many more simultaneous connections than an RN and may have increased range. This is achieved through increased equipment capabilities, positioning, or both. For example, an ARN may be a stationary or mobile device with higher power capabilities compared with the average commercial or off-the-shelf mobile device battery. An ARN may also be positioned above all other nodes such that in can communicates with many of them simultaneously. Such ARNs may be mounted, for example, on top of buildings, telephone poles, cell towers, unmanned aerial drones, or other similar implementations.

Figure 16:
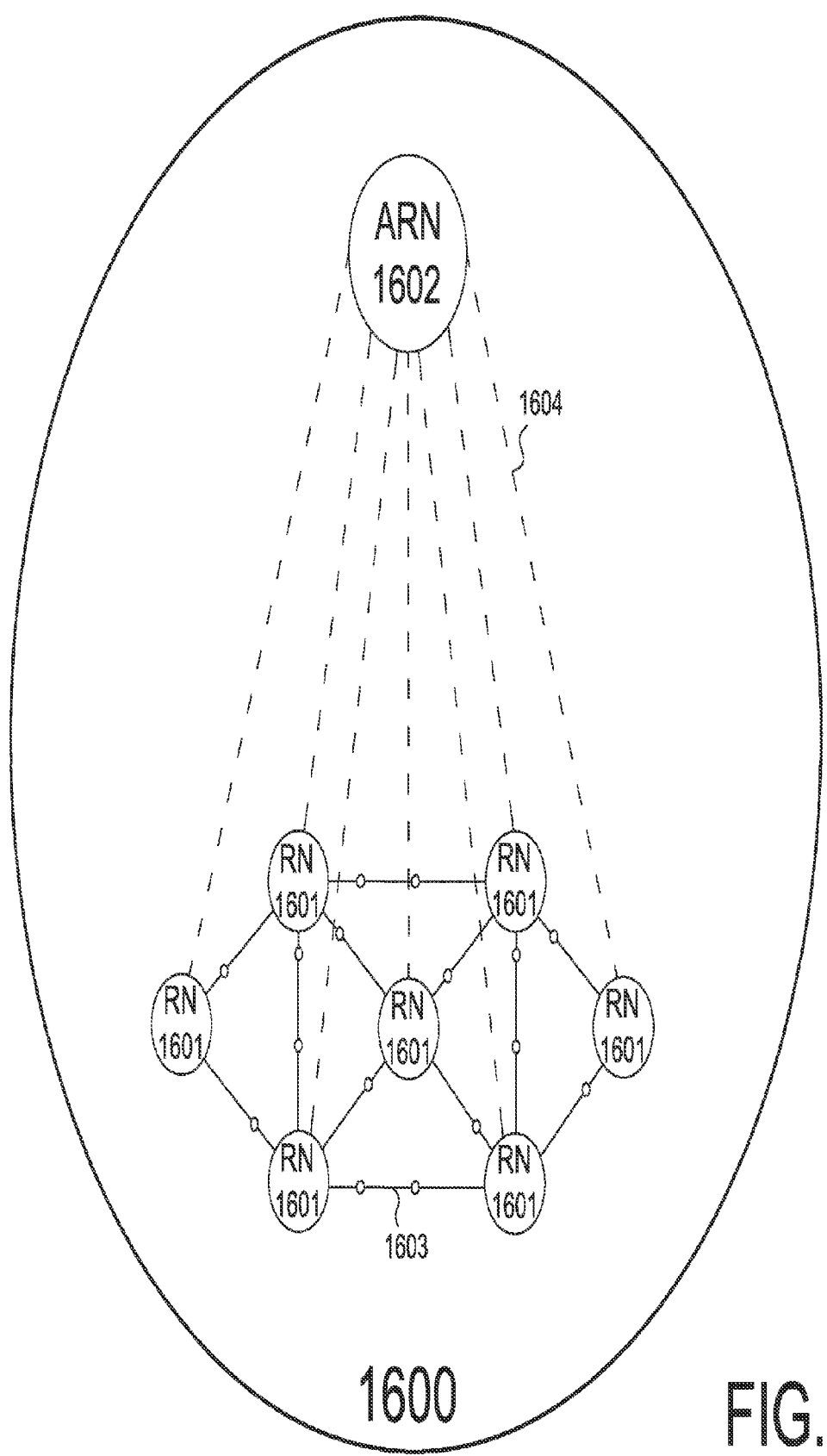
FIG. 16 shows a DYNAMET including an Assistant Relay Node according to an embodiment of the present invention.

Referring to FIG. 16, nodes 1601 in a DYNAMET cluster 1600 communicate with each neighboring node directly 1603. In order to communicate with any RN beyond its direct neighbors, a RN node 1601 must utilize direct neighbors to implement the RDP to propagate the information across the DYNAMET to the destination node. An ARN 1602 can communicate directly 1604 with any RN 1601 in the cluster 1600. With such communication between each RN 1601 and the ARN 1602, RNs 1601 can utilize the ARN 1602 in their implementation of the RDP, and there is almost always a direct connection between the ARN 1602 and both the source and destination nodes 1601.

Figure 17:
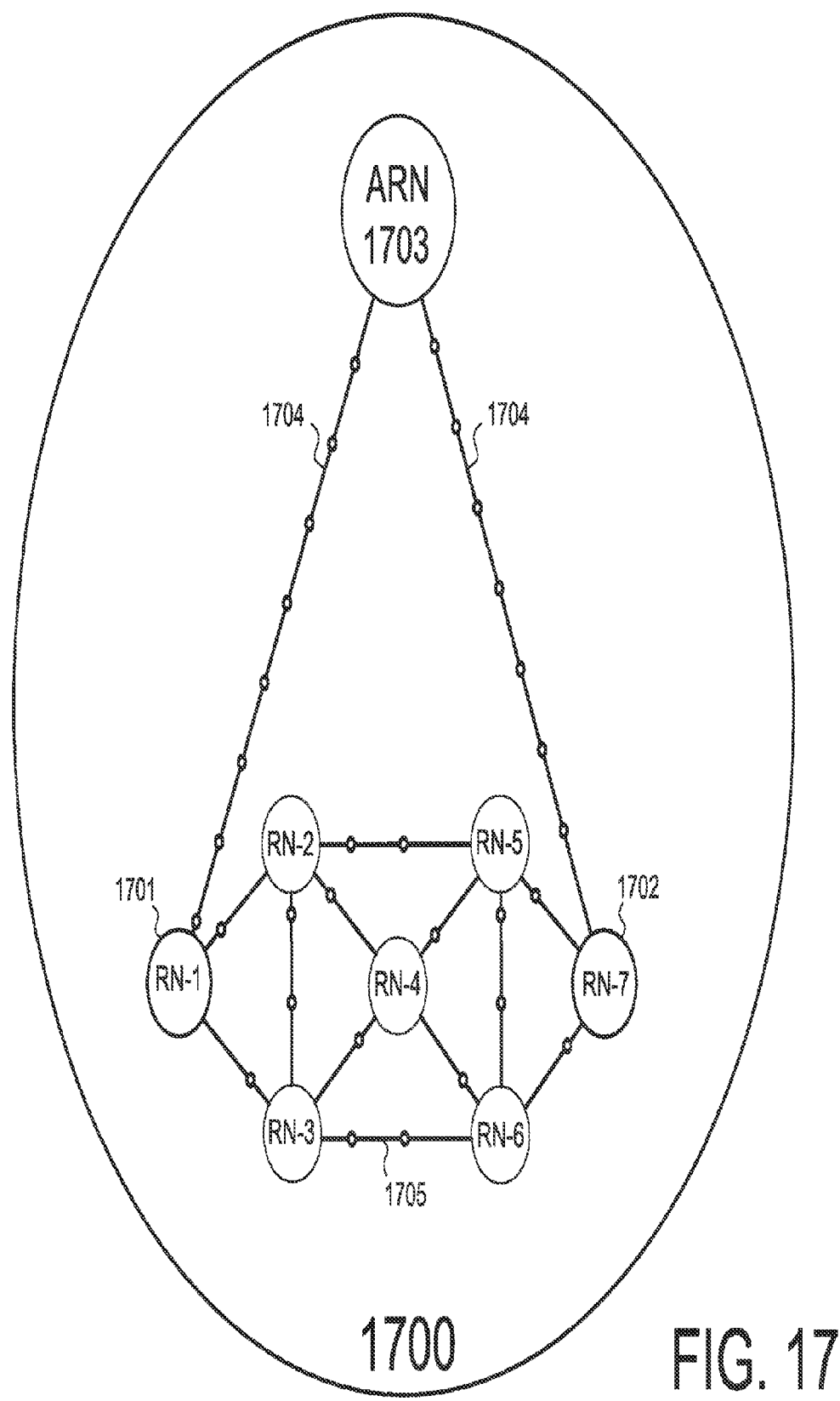
FIG. 17 shows a packet propagated through use of an Assistant Relay Node according to an embodiment of the present invention.

Referring to FIG. 17, a packet sent from RN-1 1701 to RN-7 1702 can be propagated throughout the cluster 1700 using direct connections 1705 between each node until it reaches RN-7 1702, requiring at least 3 propagations. RN-1 1701 can also send a redundant packet to the ARN 1703. The ARN 1703 is in direct communication 1704 with both RN-1 1701 and RN-7 1702. The ARN 1703 recognizes RN-7 1702 as a direct neighbor and transmits a non-redundant packet directly to RN-7 1702.

Figure 18:
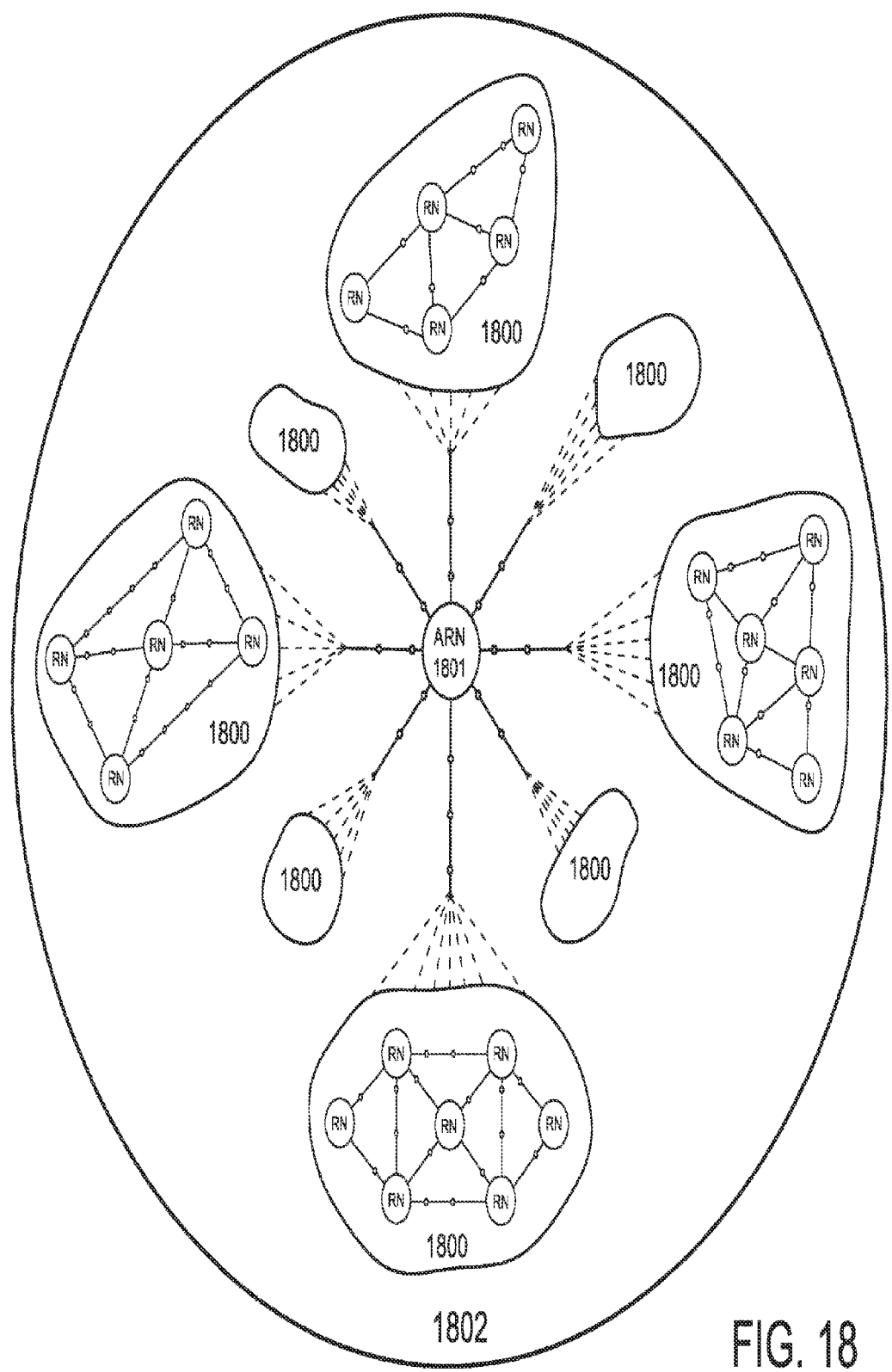
FIG. 18 shows multiple DYNAMET clusters functioning as a single network through each network's connection to a single Assistant Relay Node.

Referring to FIG. 18, an ARN 1801 is capable of linking several separated DYNAMET clusters 1800. The ARN 1801 can establish connections to nodes in multiple clusters 1800 that are otherwise out of each other's range to form direct connections or to form a LAD. The ARN 1801 links the clusters 1800 to form a single DYNAMET 1802.

Figure 19:
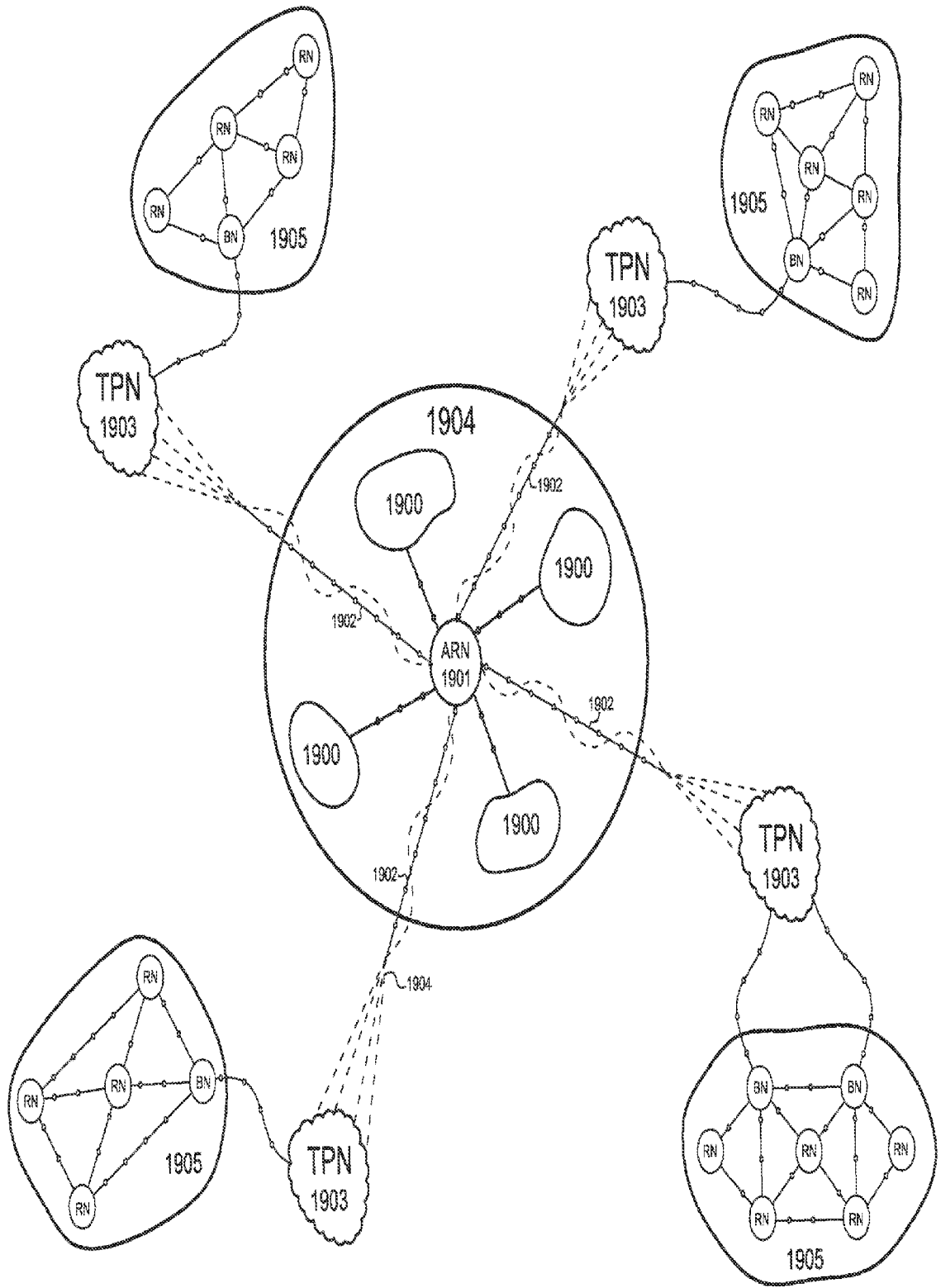
FIG. 19 shows multiple DYNAMET clusters functioning as a single network through each network's connection to a single Assistant Relay Node and the Assistant Relay Node's connection to multiple Third Party Networks.

Referring to FIG. 19, an ARN 1901 can also facilitate creation of a GAD. The ARN 1901 may establish a connection 1902 with one or more TPNs 1903, while also linking local separated clusters 1900 into a LAD 1904. This results in the concatenation of both the LAD 1904 and the clusters 1905 connected to the TPNs 1903 to be supported on the cloud.

Thus, an asynchronous dynamic wireless ad-hoc network has been provided. One skilled in the art will appreciate that the present invention can be practiced by other that the described embodiments, which are presented for purposes of illustration and not limitation, and that the invention is limited only by the claims that follow. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

What is claimed is:

1. A mobile end-user device for use in a dynamic and stochastic asynchronously updated wireless ad-hoc network comprising:
   a. a wireless communication portal for wirelessly connecting to neighboring wireless end-user devices that are part of the dynamic and stochastic asynchronously updated wireless ad-hoc network;
   b. one or more processors; and
   c. a computer-readable medium coupled to the one or more processors having instructions stored thereon which, when executed by the one or more processors, cause the one or more processors to perform at least the following steps:
      i. executing, by the one or more processors, an end-user application configured to communicate data packets via the wireless ad-hoc network;
      ii. receiving, by the one or more processors, a first data packet to be transmitted to a specified destination device, wherein the first data packet includes header data comprising a destination device identifier associated with the specified destination device and a path table that lists respective device identifiers of end-user devices that have previously received the first data packet and wherein the first data packet further includes data transmitted from a first device and designated to be transmitted to the specified destination device;

iii. routing, by the one or more processors, the first data packet to the destination device by:
1. identifying, by the one or more processors, a plurality of neighboring wireless end-user devices connected to the wireless ad-hoc mesh network and to the mobile end-user device;
2. determining, by the one or more processors, that each of the plurality of neighboring wireless end-user devices is not the destination device by comparing each respective device identifier of the plurality of neighboring wireless end-user devices to the destination device identifier;
3. determining, by the one or more processors, a first set of the plurality of neighboring wireless end-user devices whose respective device identifiers are not listed in the path table in the first data packet;
4. updating, by the one or more processors, the path table in the first data packet with a respective device identifier associated with the mobile end-user device; and
5. transmitting, via the wireless communication portal at the mobile end-user device, the first data packet with the updated path table to the first set of the plurality of neighboring wireless end-user devices whose respective device identifiers are not listed in the updated path table.

2. The mobile end-user device of claim 1, wherein at least one end-user device in the network is a wireless mobile device.

3. The mobile end-user device of claim 1, wherein at least one end-user device in the network is a wireless stationary device.

4. The mobile end-user device of claim 1, wherein at least one end-user device in the network is a computer with wireless communication.

5. The mobile end-user device of claim 1, wherein the mobile end-user device is a wireless tablet computer.

6. The mobile end-user device of claim 1, wherein the mobile end-user device is a wireless cell phone.

7. The mobile end-user device of claim 1, wherein the process of routing, by the one or more processors, the first data packet further comprises determining, by the one or more processors, respective neighbor qualities of at least the first set of the plurality of neighboring wireless end-user devices.

8. The mobile end-user device of claim 7, wherein the process of transmitting, via the wireless communication portal at the mobile end-user device, the first data packet comprises analyzing the respective neighbor qualities of the first set of the plurality of neighboring wireless end-user devices for satisfaction of a threshold value and transmitting the first data packet to those of the first set of the plurality of neighboring wireless end-user devices that have respective neighbor qualities that satisfy the threshold value.

9. The mobile end-user device of claim 7, wherein the respective neighbor qualities are based at least in part on respective connection qualities between the mobile end-user device and the plurality of neighboring wireless end-user devices.

10. The mobile end-user device of claim 9, wherein the respective connection qualities are based at least in part on signal strengths.

11. The mobile end-user device of claim 9, wherein the respective connection qualities are based at least in part on connection data rates.

12. The mobile end-user device of claim 9, wherein the respective connection qualities are based at least in part on retransmission rates.

13. The mobile end-user device of claim 9, wherein the respective connection qualities are based at least in part on data packet loss ratios.

14. The mobile end-user device of claim 7, wherein the respective neighbor qualities are based at least in part on respective device functional abilities of the devices in the plurality of neighboring wireless end-user devices.

15. The mobile end-user device of claim 14, wherein the device functional abilities are based at least in part on device role.

16. The mobile end-user device of claim 14, wherein the device functional abilities are based at least in part on number of available neighbors.

17. The mobile end-user device of claim 14, wherein the device functional abilities are based at least in part on battery life.

18. The mobile end-user device of claim 14, wherein the device functional abilities are based at least in part on availability of wireless media.

19. The mobile end-user device of claim 14, wherein the device functional abilities are based at least in part on hardware components.

20. The mobile end-user device of claim 14, wherein the device functional abilities are based at least in part on interoperability with third-party sensors.

21. The mobile end-user device of claim 20, wherein the third-party sensors include any of GPS, speedometers, or accelerometers.

22. The mobile end-user device of claim 7, wherein the respective neighbor qualities are based at least in part on time variables associated with the devices in the plurality of neighboring wireless end-user devices.

23. The mobile end-user device of claim 22, wherein the time variables include at least connection time to the dynamic and stochastic asynchronously updated wireless ad-hoc network.

24. The mobile end-user device of claim 22, wherein the time variables include at least connection time to a specific one of the plurality of neighboring end-user devices.

25. The mobile end-user device of claim 22, wherein the time variables include at least time spent performing specified roles.

26. The mobile end-user device of claim 1, wherein the computer-readable medium coupled to the one or more processors has instructions stored thereon which, when executed by the one or more processors, cause the one or more processors to perform the role of a gateway for communicating with a third party network.

27. The mobile end-user device of claim 1, wherein the computer-readable medium coupled to the one or more processors has instructions stored thereon which, when executed by the one or more processors, cause the one or more processors to populate a connections table with device identifiers of neighboring wireless end-user devices.

28. The mobile end-user device of claim 1, wherein the computer-readable medium coupled to the one or more processors has instructions stored thereon which, when executed by the one or more processors, cause the one or more processors to process a data packet.

* * * * *